Sept. 16, 1958 H. VANDERBURG 2,852,289
TAKE-UP ADJUSTER FOR STEERING IDLER ARMS
Filed Dec. 28, 1954 3 Sheets-Sheet 1
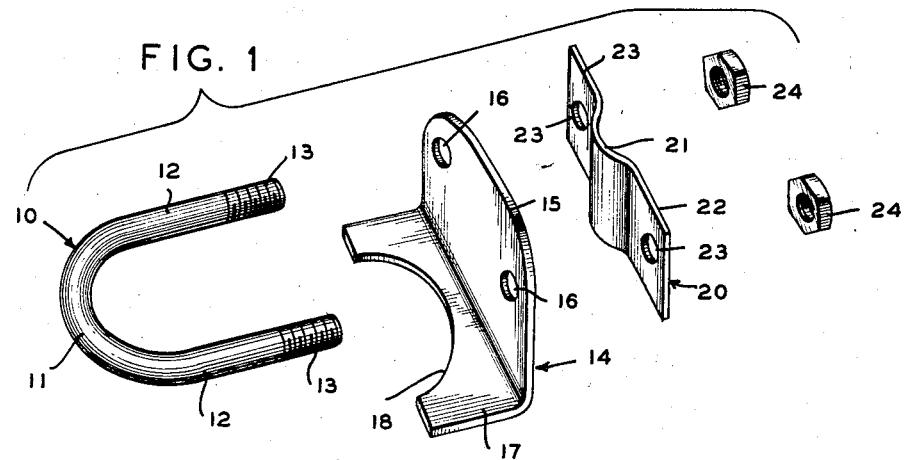
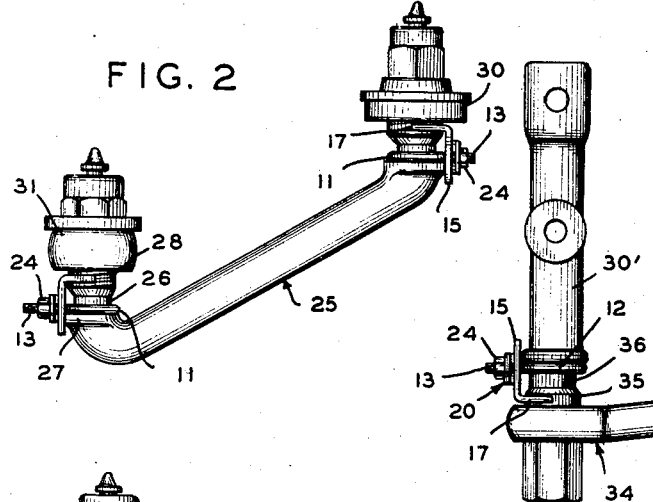
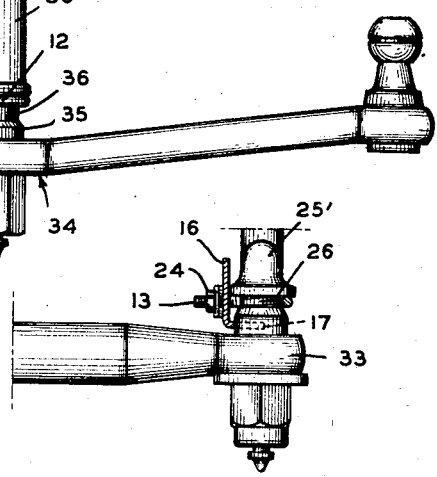
INVENTOR
HAROLD VANDERBURG Sept. 16, 1958
H. VANDERBURG
2,852,289
TAKE-UP ADJUSTER FOR STEERING IDLER ARMS
Filed Dec. 28, 1954
3 Sheets-Sheet 2
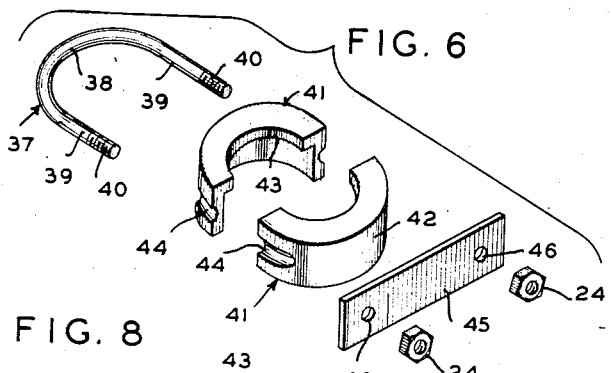
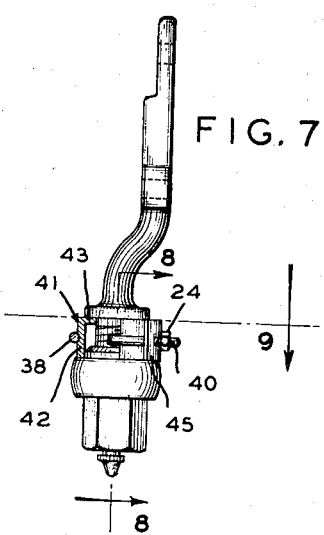
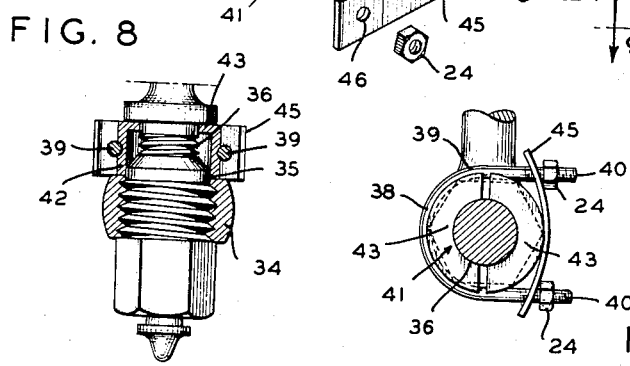
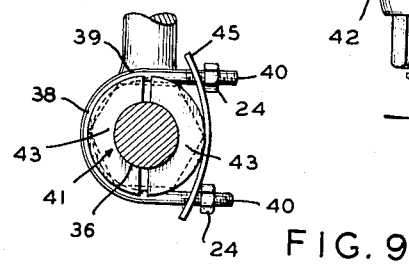
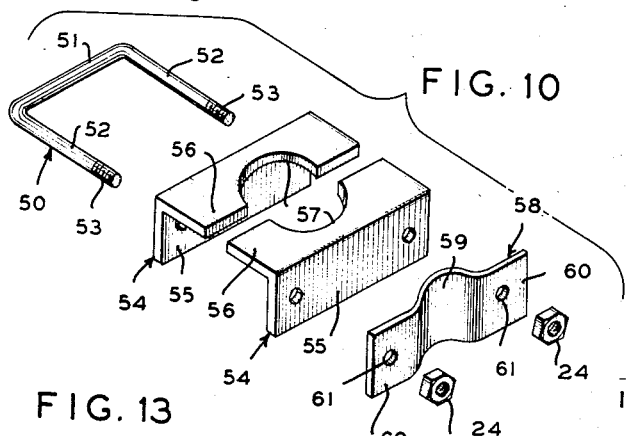
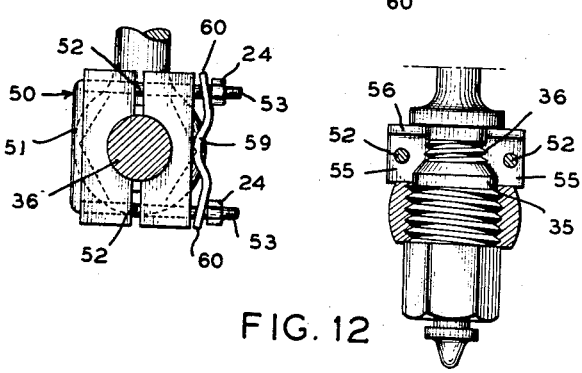
INVENTOR
HAROLD VANDERBURG
BY *A. Yates Dowell*
ATTORNEY Sept. 16, 1958     H. VANDERBURG     2,852,289
TAKE-UP ADJUSTER FOR STEERING IDLER ARMS
Filed Dec. 28, 1954     3 Sheets-Sheet 3
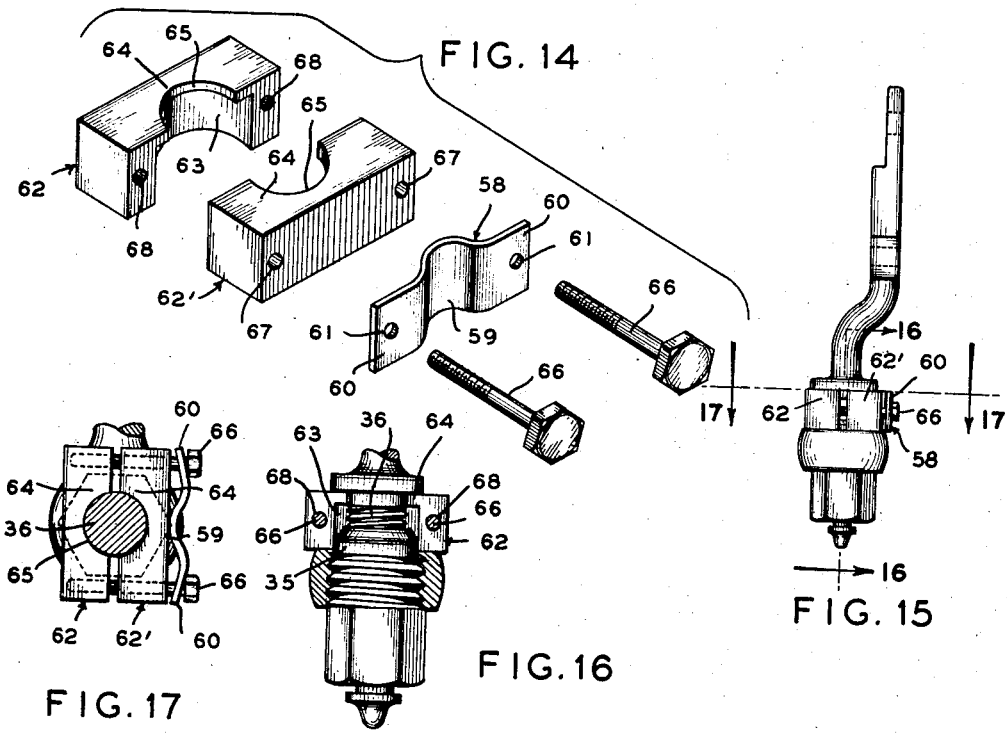
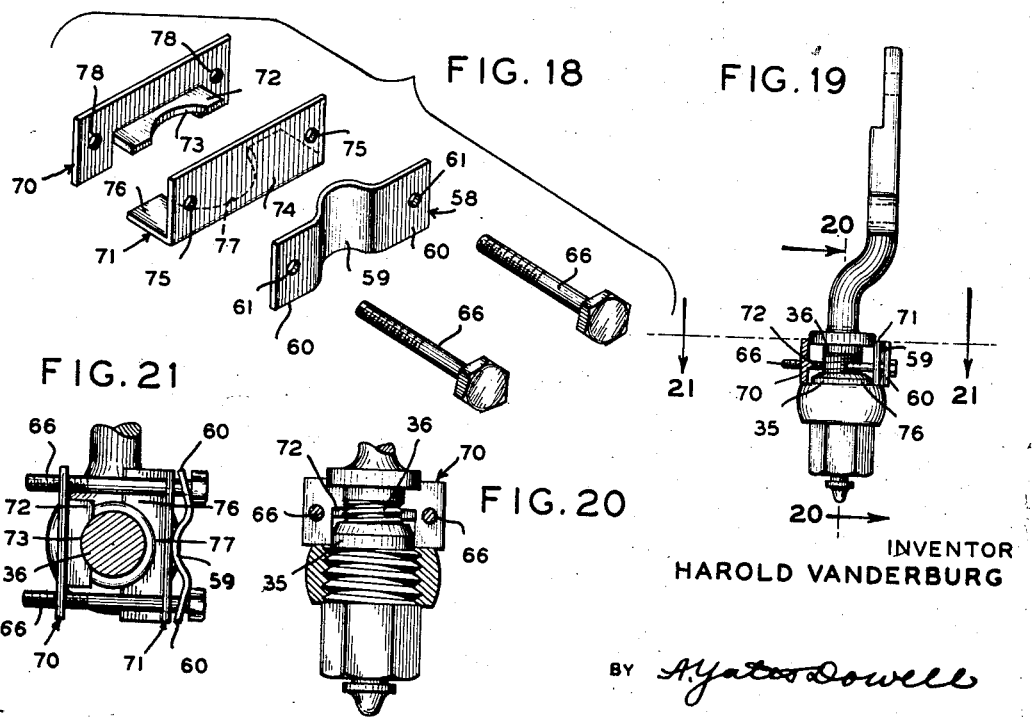
INVENTOR
HAROLD VANDERBURG
BY A. Yates Dowell
ATTORNEY

United States Patent Office 2,852,289
Patented Sept. 16, 1958

2,852,289
TAKE-UP ADJUSTER FOR STEERING IDLER ARMS

Harold Vanderburg, Birmingham, Ala.

Application December 28, 1954, Serial No. 478,150

14 Claims. (Cl. 287—93)

This invention relates to vehicle steering mechanisms of the general type shown in application Serial No. 336,284, now Patent No. 2,747,517 of which James B. Dick and Harold Vanderburg are joint applicants, and more particularly to an attachment for the idler arm by means of which looseness or play between the idler arm bushing and the arm or bracket member connected thereto may be obviated.

As a result of usage the idler arm in certain types of steering linkage in present day automobiles frequently becomes loose in its mounting which results in play in the steering mechanism, wheel shimmying, and excessive wear on the tires. In the past in order to remedy this situation, the idler arm and associated parts forming the mounting have been replaced or various attachments have been used in an attempt to solve the problem.

Replacement is a tedious and relatively expensive operation and only affords temporary improvement as the new parts may soon become worn resulting in a similar undesirable condition. Various attachments have been employed to take up the slack, but some of these have required altering or modifying the idler arm or pin so that they could be attached, or have required a substantial amount of labor for their attachment or have been expensive to manufacture.

It is an object of the present invention to provide a take-up attachment or adjuster for the idler arm which is inexpensive to produce, compact, and which may be easily installed in a minimum of time and without modification to existing parts of the vehicle.

A further object is the provision of an idler arm take-up attachment which is simple to install on the vehicle and which is constructed to compensate for unevenness in the parts to which it is attached.

These and other objects of the invention will become apparent from the following description in conjunction with the accompanying drawings in which:

Fig. 1 is an exploded perspective of a preferred embodiment of the invention;

Fig. 2, a side elevation, to a reduced scale, of an idler arm with a pair of adjusters mounted thereon;

Fig. 3, a side elevation illustrating the use of the device on another type of idler arm;

Fig. 4, a section on line 4—4 of Fig. 3;

Fig. 5, an elevation, partly in section, illustrating the use of the attachment on still another type of idler arm;

Fig. 6, an exploded perspective of a modified form of the invention;

Fig. 7, a side elevation, partly in section, to a reduced scale, showing the use of the attachment on an idler arm and bracket;

Fig. 8, a section to an enlarged scale on line 8—8 of Fig. 7;

Fig. 9, a section to an enlarged scale on line 9—9 of Fig. 7;

Fig. 10, an exploded perspective of a further modification of the invention;

Fig. 11, a side elevation, partly in section, to a reduced scale, showing the use of the attachment on an idler arm and bracket;

Fig. 12, a section to an enlarged scale on line 12—12 of Fig. 11;

Fig. 13, a section to an enlarged scale on line 13—13 of Fig. 11;

Fig. 14, an exploded perspective of a further modified form of the invention;

Fig. 15, a side elevation, partly in section, to a reduced scale, showing the use of the attachment on an idler arm and bracket;

Fig. 16, a section to an enlarged scale on line 16—16 of Fig. 15;

Fig. 17, a section to an enlarged scale on line 17—17 of Fig. 15;

Fig. 18, an exploded perspective of another modified form of the invention;

Fig. 19, a side elevation, partly in section, to a reduced scale, showing the use of the attachment on an idler arm and bracket;

Fig. 20, a section to an enlarged scale on line 20—20 of Fig. 19; and

Fig. 21, a section to an enlarged scale on line 21—21 of Fig. 19.

Briefly stated, the take-up attachment of the present invention includes a U-bolt or the like which receives the idler arm or idler arm bracket in its central curved portion and draws a bracket member into snug engagement with the idler arm bushing and bracket, simultaneously a spring member being interposed to permit adjustment of the bracket member on the arms of the U-bolt to accommodate unevenness in the outer surface of the bushing and to maintain the parts under the desired degree of compression or restraint.

Referring to the drawings (Figs. 1–5) the adjuster includes a U-bolt 10 having a central curved portion or web 11 and arms 12 with threaded extremities 13. An L-shaped bracket 14 has an upstanding back 15 with spaced apertures 16 for receiving the arms 12 of the U-bolt. At the lower portion of the back 15 a foot 17 extends at substantially right angles and has a semicircular cutout portion 18 providing a seat.

For maintaining the proper tension on the seat a leaf spring member 20 is provided having an inwardly disposed central portion 21 and outwardly disposed portions 22 which bow inwardly under compression. Each outwardly disposed portion has an aperture 23 therein for receiving an arm of the U-bolt. Fastening means or nuts 24 are used to secure the bracket and spring to the U-bolt. Instead of a leaf spring a pair of coil springs may be used, one for each end of the U-bolt.

In use the device is mounted on an idler arm such as 25 or 25' (Figs. 2–4) by placing the U-bolt around the threaded end member 26. The arms of the U-bolt extend around the end portion 26, and the bracket 14 is mounted on the opposite side of the end portion as illustrated. In this position the back 15 engages the flange 27 adjacent the threaded end portion, and the seat 18 engages the bushing 28 of the steering mechanism. On the idler arms, illustrated in Figs. 2 to 4, it is desirable to use an adjustor at each end, as shown.

In Fig. 2 the idler arm 25 is mounted on a bracket member 30 attached to the vehicle frame (not shown), and carries a cross link 31 at its other end. Similarly, in Figs. 3 and 4 idler arm 25' is mounted on bracket member 32 and carries cross link 33.

On another type of idler arm such as that illustrated in Fig. 5 the idler arm 34 has only one bushing 35 of the type under consideration for receiving a threaded end 36 of an arm or bracket member 30', and one adjuster is sufficient.

The adjuster may be installed at any angle around the bushing, except where the end portion of the idler arm makes an acute angle with the mid section as shown in the lower lefthand section of Fig. 2. Even on this type of idler arm, no difficulty is encountered in its installation.

The spring member not only serves to maintain the parts under the desired tension but permits the adjuster to accommodate uneven or out of round bushings. Inasmuch as the spring also keeps the fastening elements under tension, it is unnecessary to use a lock nut or lock washer to prevent their loss.

In use the seat portion 18 of the bracket rides easily around the bushing without substantially increasing the resistance to movement between the parts. After a period of breaking in or wear of the adjuster on the arm, the nuts may be tightened if necessary.

It will be observed, therefore, that the adjuster may be used with connections between an internally threaded bushing and an arm having an end portion threaded for engagement therewith. The device may be used with numerous types of idler arms such as those illustrated. These include those shown in Figs. 2 to 4 in which the ends of the idler arm are threaded for engagement with a bushing, or the type in Fig. 5 in which an end of the idler arm has a bushing mounted therein for the reception of a threaded end of an arm or bracket member.

Although the attachment previously described is a preferred form of my invention, it may be embodied in other structures such as those shown in Figs. 6 through 21.

Referring to Figs. 6 through 9, the adjuster comprises a U-bolt 37 having a web 38 and arms 39 with threaded extremities 40. A pair of similarly shaped bracket members 41 are provided, each having a semicircular body 42 with an inwardly extending rim or flange 43 at one side thereof, and a groove 44 extending a short distance backwardly from its ends for receiving an arm of the U-bolt. A leaf spring member 45 has spaced apertures 46 for receiving the arms 39 of the U-bolt 37.

In use the semicircular members 41 are mounted with one on either side of the bushing 35, the flanges 43 engaging the threaded end 36 of the arm or bracket member, and the opposite side of the semicircular member 41 engaging the exterior of the bushing 35, just above the end of the idler arm 34. The fastening members 24 are threaded onto the U-bolt arms 39 the desired distance to draw the members 41 together and into contact with the threaded portion 36 and bushing 35. The spring 45 holds the parts in resilient contact and permits the accommodation of irregular or out-of-round bushings.

In the further modification of Figs. 10–13, a squared U-bolt 50 is employed having a web 51 and arms 52 with threaded extremities 53. A pair of bracket members 54 are used, each being L-shaped and having an upstanding back portion 55 and a laterally extending foot portion 56 with an arcuate recess 57 in the central portion thereof. For maintaining the proper compression on the parts, a leaf spring member 58 is used having a centrally depressed portion 59 and outwardly extending arms 60.

The bracket described is mounted similarly to the bracket of Figs. 6–9, the arcuate seat portion 57 engaging the threaded end portion 36 of the arm or bracket, and the back 55 engaging the bushing 35.

A still further modification is illustrated in Figs. 14–17, this including a pair of similarly shaped blocks 62, 62' having a central arcuate recess 63 on one side thereof with a rim or flange 64 at one side of the recess 63 providing a recess 65 of less depth than the recess 63. A leaf spring member 58 is employed like that previously described, and machine bolts 66 extend through the spaced apertures 61 in the spring 58, through spaced plain apertures 67 in block 62' and into spaced threaded apertures 68 in block 62. The bracket is mounted similarly to that described for Figs. 10–13, as illustrated in the drawings.

A further modification is illustrated in Figs. 18–21 and includes a pair of bracket members 70 and 71. Bracket member 70 has spaced threaded apertures 78 and is substantially flat but has a central ledge 72 extending longitudinally from its inner face. The ledge may be formed as illustrated by slitting the bracket member at spaced intervals from one side edge and bending the portions between the divisions at an angle. The ledge 72 has a central arcuate slot 73 providing a seat.

The mating bracket member 71 is L-shaped in configuration and has a back 74 with spaced apertures 75, and an angularly disposed leg 76 with a central arcuately slotted portion 77 providing a seat. A leaf spring member 58 similar to that previously described is also provided. A pair of machine bolts 66 extend through the spaced apertures in the spring member 58 and the bracket member 71 and are threadedly received in the spaced apertures 78 in the bracket member 70.

In use the bracket members 70 and 71 are mounted on opposite sides of the bushing, the seat portion 73 of bracket 70 engaging the threaded end 36 of the arm or bracket, and the seat portion 77 of the bracket 71 engaging the bushing 35.

Although the attachments illustrated in Figs. 6–21 have been illustrated in use on a particular type of idler arm attachment, it is understood that their use is not so limited but that they may be used on other types including those illustrated in Figs. 2 and 4 which have been previously described.

The type of pivotal connection shown is of the type shown in the Carlson Patent 2,689,756. In this type of joint the ends of the idler arm 25 (Fig. 3) are threaded. The bracket member 30 is carried by the vehicle chassis and one end of the idler arm is supported by the bushing in the bracket corresponding to bushing 35 (Fig. 12). The drag link connects and is supported by the idler arm and the pivoted arm of the steering mechanism operated by the conventional steering wheel in a well known manner as shown in Marquis Patent 2,660,905, for example. The bracket and drag link (Fig. 3) carry bushings which are both internally and externally threaded as shown in Fig. 12 preferably in opposite directions. The take-up adjuster operates between relatively pivoted parts on the idler arm and the bracket or drag link as explained above. It will also be evident that the drag link may have threaded ends and the idler arm may carry the cooperating bushings or one end of the idler arm may have a bushing and the other end may be threaded. The invention is also adaptable to other types of bearings.

Accordingly, the invention includes a bracket attachment which is mounted in resilient contact with the threaded end and bushing of an idler arm connection and which permits normal oscillatable movement but prevents looseness or excessive play in the connection.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. For use with an internally threaded bushing and an arm having an end portion threaded for engagement with the bushing, the arm and bushing being mounted for oscillatable motion therebetween, a slack take-up adjuster comprising an L-shaped bracket having an upstanding portion and a foot portion, the foot portion having a curved seat therein receiving the bushing, the upstanding portion engaging the arm, the upstanding portion having a pair of apertures spaced one on either side of the threaded end portion and intermediate the foot portion and the portion of the upstanding portion which engages the arm, a U-bolt having a central portion engaging the threaded end portion on the side of the arm opposite to that engaged by the upstanding portion of the bracket, the arms of the U-bolt extending through the spaced apertures in the upstanding portion of the bracket, a leaf spring member having a centrally depressed portion engaging the surface of the upstanding portion of the bracket more distant from the bight portion of the U-bolt and having arms extending outwardly therefrom and spaced from the surface of the upstanding portion of the bracket, said leaf spring member's arms each having an aperture for the reception of an arm of the U-bolt, and fastening means engaged with the ends of the arms of the U-bolt and drawing the spring member against the bracket and the bracket into snug engagement with the bushing and the arm.

2. For use with an internally threaded bushing and an arm having an end portion threaded for engagement with the bushing, the arm and bushing being mounted for oscillatable motion therebetween, a slack take-up adjuster comprising a bracket having an upstanding portion and a foot portion, the foot portion having a curved seat therein receiving the bushing, the upstanding portion engaging the arm, the upstanding portion having a pair of apertures spaced one on either side of the threaded end portion and intermediate the foot portion and the portion of the upstanding portion which engages the arm, a fastening element having a central portion engaging the threaded end portion on the side of the arm opposite to that engaged by the upstanding portion of the bracket, the arms of the fastening element extending through the spaced apertures in the upstanding portion of the bracket, a spring member engaging the surface of the upstanding portion of the bracket more distant from the central portion of the fastener element, said fastening element drawing the spring member against the bracket and the bracket into snug engagement with the bushing and the arm.

3. For use with a bushing and an arm having an end portion engaged with the bushing, the arm and bushing being mounted for oscillatable motion therebetween, a slack take-up adjuster comprising a bracket having an upstanding portion and a foot portion, the foot portion having a seat receiving the bushing, the upstanding portion engaging the arm, the upstanding portion having a pair of apertures spaced one on either side of the end portion and intermediate the foot portion and the portion of the upstanding portion which engages the arm, a fastening element having a central portion engaging the end portion on the side of the arm opposite to that engaged by the upstanding portion of the bracket, the arms of the fastening element extending through the spaced apertures in the upstanding portion of the bracket, a spring member engaging the upstanding portion of the bracket, said fastening element drawing the bracket into resilient snug engagement with the bushing and the arm.

4. For use with a bushing and an arm having an end portion engaged with the bushing, the arm and bushing being mounted for oscillatable motion therebetween, a slack take-up adjuster comprising a bracket having an upstanding portion and a foot portion, the foot portion having a seat receiving the bushing, the upstanding portion engaging the arm, a fastening element having a portion engaging the end portion of the arm on the side of the arm opposite to that engaged by the upstanding portion of the bracket, a spring member engaging the upstanding portion of the bracket, said fastening element drawing the bracket into resilient snug engagement with the bushing and the arm.

5. For use with an internally threaded bushing and an arm having an end portion threaded for engagement with the bushing, the arm and bushing being mounted for oscillatable motion therebetween, a slack take-up adjuster comprising a pair of similarly shaped bracket members, each having a semi-cylindrical body portion and an inwardly extending flange with an arcuate recess therein providing a seat, the two bracket members being positioned one on either side of the arm and bushing, the internal surface of each of the semi-cylindrical body portions engaging the bushing and the arcuate seat engaging the end portion of the arm, there being a gap intermediate the adjacent ends of the bracket members, the exterior surfaces of the end portions of the bracket members having grooves intermediate the sides thereof, a flat leaf spring member, a U-bolt having a curved central portion and spaced arms for receiving one of the bracket members with the arms engaging the grooves in both of the bracket members, the arms extending through the spaced apertures in the spring member, and fastening means connected to the extremities of the arms of the U-bolt and drawing the spring member against the adjacent bracket member and the bracket members together into snug engagement with the bushing and the arm.

6. For use with a bushing and an arm having an end portion engaged with the bushing, the arm and bushing being mounted for oscillatable motion therebetween, a slack take-up adjuster comprising a pair of similarly shaped bracket members, each having a semi-cylindrical body portion and an inwardly extending flange with an arcuate recess therein providing a seat, the two bracket members being positioned one on either side of the arm and bushing, the internal surface of each of the semi-cylindrical body portions engaging the bushing and the arcuate seat engaging the end portion of the arm, there being a gap intermediate the adjacent ends of the bracket members, the bracket members having abutment means on the sides thereof, holding means for the bracket members and engaging the abutment means in the bracket members, and resiliently yieldable means connected to the holding means and drawing the bracket members together into snug engagement with the bushing and the arm.

7. For use with an internally threaded bushing and an arm having an end portion threaded for engagement with the bushing, the arm and bushing being mounted for oscillatable motion therebetween, a slack take-up adjuster comprising a pair of L-shaped bracket members, each having an upstanding portion and a foot portion, the foot portion having a curved seat therein receiving the end portion, the upstanding portion engaging the bushing, the upstanding portion having a pair of apertures spaced one on either side of the end portion and intermediate the foot portion and the portion of the upstanding portion which engages the arm, a fastening element having a central portion engaging the upstanding portion of one of the bracket members and a pair of spaced arms extending through the spaced apertures in each of the bracket members, one of the arms passing on either side of the end portion, fastening means for holding the bracket members in snug engagement with the arm and bushing, and resilient means interposed between the fastening means and one of the brackets and permitting limited movement of the bracket members relative to each other.

8. For use with a bushing and an arm having an end portion engaged with the bushing, the arm and bushing being mounted for oscillatable motion therebetween, a slack take-up adjuster comprising a pair of L-shaped bracket members, each having an upstanding portion and a foot portion, the foot portion having a curved seat therein receiving the end portion, the upstanding portion engaging the bushing, and means urging the bracket members together and into snug engagement with the bushing and arm.

9. For use with a bushing and an arm having an end portion engaged with the bushing, the arm and bushing being mounted for oscillatable motion therebetween, a slack take-up adjuster comprising a pair of similarly shaped bracket members, each having an elongate body portion with a semi-cylindrical recess and an inwardly extending flange at one side thereof with an arcuate recess therein providing a seat, the two bracket members being positioned one on either side of the arm and bushing, the internal surface of each of the semi-cylindrical recesses engaging the bushing and the arcuate seat engaging the end portion of the arm, there being a gap intermediate the adjacent ends of the bracket members, and means urging the bracket members together and into snug engagement with the bushing and the arm.

10. For use with a bushing and an arm having an end portion engaged with the bushing, the arm and bushing being mounted for oscillatable motion therebetween, a slack take-up adjuster comprising a first L-shaped bracket having an upstanding portion and a foot portion, the foot portion having a curved seat therein receiving the bushing, the upstanding portion engaging with the arm, a second bracket member comprising a flat member having an inwardly extending transverse portion in spaced relation from one of the sides thereof, said transverse portion having a curved seat therein receiving the end portion of the arm, the bracket members being placed on opposite sides of the arm, and means urging the bracket members together and into intimate engagement with the bushing and the arm.

11. For use with a bushing and an arm having a portion engaged with the bushing, the arm and bushing being mounted for oscillatable motion therebetween, a slack take-up adjuster comprising a bracket having two seat portions, one of said seat portions engaging the arm, the other seat portion engaging the bushing, a complementary element having a central portion engaging the side of the arm opposite to that engaged by the bracket, and resilient means connected to the bracket and urging it into intimate engagement with the bushing and arm.

12. For use in a connection with an arm having a portion rotatably mounted in a bushing, an adjuster for the removal of slack from the connection comprising a bracket having a seat receiving the bushing, another portion of the bracket engaging the arm, and means connected to the bracket and urging it into intimate engagement with the bushing and arm.

13. An attachment for taking out looseness between two pivotally connected members without disassembly of the members, said attachment including a body having an L-shaped configuration in at least a section thereof, the stem of said L-shaped body being adapted to contact and be fixed relatively to one of said members, means to detachably secure said stem to said one member, spring means reacting between said stem and said member to provide a continuous spring action on the foot portion of said L-shaped body, said foot portion having a yoke-shaped seat portion for engaging a generally circular portion on said other member, whereby the lost motion or looseness between said members is taken up under a uniform spring pressure.

14. An attachment for taking out looseness between two pivotally connected members, said attachment including a body having an L-shaped configuration in at least a section thereof, the stem of said L-shaped body being adapted to contact and at least a portion of said stem to be fixed relative to one of said members, means to detachably secure said stem to said one member, spring means reacting between said detachable securing means between said stem and said one member to provide a continuous spring action on the foot portion of said L-shaped body, a yoke-shaped seat portion on the foot portion of said attachment for engaging a generally circular portion of said other member, whereby the looseness between said members is taken up under a continuous yieldable uniform pressure.

References Cited in the file of this patent

UNITED STATES PATENTS

| | | |
|---|---|---|
| 166,039 | Thomas | July 27, 1875 |
| 194,633 | Wilks | Aug. 28, 1877 |
| 234,894 | Sammis | Nov. 30, 1880 |
| 826,186 | McSpadden et al. | July 17, 1906 |
| 1,475,744 | Brown | Nov. 27, 1923 |
| 2,631,864 | Dick et al. | Mar. 17, 1953 |
| 2,689,756 | Carlson | Sept. 21, 1954 |
| 2,726,107 | Kasten | Dec. 6, 1955 |
| 2,773,697 | Pritchard | Dec. 11, 1956 |